June 5, 1956  R. E. LYONS  2,749,151
SWIVEL COUPLING WITH REMOVABLE WIRE LOCKING MEANS
Filed April 1, 1954

Inventor.
Richard E. Lyons

United States Patent Office 2,749,151
Patented June 5, 1956

2,749,151

SWIVEL COUPLING WITH REMOVABLE WIRE LOCKING MEANS

Richard E. Lyons, Libertyville, Ill., assignor to Charles L. Conroy, Waukegan, and Walter Fritsch, Libertyville, Ill.

Application April 1, 1954, Serial No. 420,371

1 Claim. (Cl. 285—97.3)

This invention relates generally to elbow coupling assemblies, and more particularly to an elbow fitting attached to the end of a nonmetallic flexible hose by means of a swaged-on type coupling.

The most efficient swaged-on couplings include an insert projected into the bore of a hose, and a shell swaged or contracted on the exterior of the hose to compress and grip the hose wall in cooperation with the insert. In some instances the insert may be expanded together with contraction of the shell to effect compression of the hose wall. Also, in certain cases the inserts are sufficiently fragile to require a supporting mandrel pin to prevent their fracture or collapse as a result of compression forces. Lastly, in swaged-on couplings of the foregoing character, and particularly those on which a mandrel is not used, it is highly desirable to check possible restriction of the insert bore with a gage pin following attachment of the coupling on the hose.

From the foregoing it will be obvious, that in order to utilize either an expanding pin, a supporting mandrel, or a gaging pin, the elbow fitting cannot be attached until after the coupling is swaged-on.

Therefore, the present invention has primarily for its object to provide a hose and elbow coupling assembly in which an independent elbow fitting may be securely attached to the outer end of a swaged-on coupling with a pressure seal lock.

Incidental to the foregoing, a more specific object of the invention resides in the provision of a pressure sealed swivel connection between the swaged-on coupling and the elbow fitting.

A still further object is to provide detachable locking means between the coupling and elbow fitting to permit replacement of either the coupling or sealing means.

With the above and other objects in view, the invention resides in the novel features of construction fully described in the specification, and more particularly defined by the appended claim, it being understood that modifications in structure and design are contemplated within the scope of the invention.

Figures 2, 3:
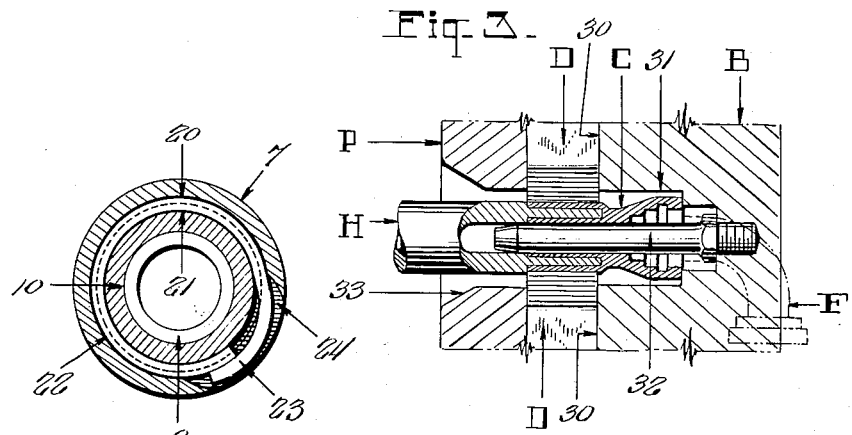
Figure 2 is a transverse sectional view taken on the line 2—2 of Figure 1.

Figure 3 schematically illustrates a conventional apparatus for attaching swaged-on couplings to the ends of rubber or synthetic hose.

With particular reference to the accompanying drawing, the assembly illustrated consists essentially of three elements, namely, a flexible non-metallic hose H formed of rubber or synthetic material, a coupling C permanently swaged on the end of the hose, and an adapter fitting F secured to the coupling with a pressure seal subsequent to attachment of the coupling on the hose.

The coupling C is of conventional type, with the exception of the fitting connection consisting of a distinctive female body 7 to which a tubular insert 5 and a spaced outer shell 6 are concentrically secured by any desired method, such as fusing, crimping, threading or the like. Obviously in some instances the insert 5 and shell 6 may be formed integral with the body 7.

The adapter fitting F includes a tubular section 8, which in the present instance is provided with a flanged ring 9 for attachment to another fitting or piece of equipment. The manner in which the fitting is secured to a piece of equipment is of no particular consequence to the invention.

Secured upon the end of the tubular section 8 is a male head 10 having a central bore 11, preferably of the same diameter as the bore of the tubular section 8 and the insert 5. A recess 12 formed in the head 10 receives the end of the tubular section 8, which is fused or otherwise secured in the recess.

The extended end 13 of the head 10 is reduced to form a transverse shoulder 14, positioned intermediate the inner and outer ends of the head. To receive the head 10, the female body 7 is provided with a bore 15, snugly fitting the enlarged portion of the head and forming a transverse shoulder 16, spaced from and opposing the shoulder 14 to form an annular compartment 17 between the body 7 and the head 10. A conventional O ring 18 positioned in the compartment 17 provides a pressure seal between the female body 7 of the coupling and the male head 10 of the fitting. If desired, a back-up washer 19 of leather or other suitable material may be employed in the compartment 17 to prevent the O ring from extruding under pressure.

To coaxially lock the female body 7 and male head 10, the bore 15 of the female body, and the outer perifery of the enlarged portion of the head 10 journaled in the bore, are provided with complementary grooves 20 and 21, respectively, which form an annular passage 22 for reception of a flexible locking wire 23. For assembly of the locking wire 23 in the passage 22, an elongated transverse slot 24 is formed in the body 7 in alignment with the groove 20, to provide access between the passage 22 and the exterior of the body 7.

Assembly operation

The present assembly is accomplished by first attaching the coupling C on the end of the hose H, then inserting the male head 10 of the fitting F into the female body 7 of the coupling C, with the O ring 18 and back-up washer 19 assembled on the reduced end 13 of the head. One end of the locking wire 20 is then inserted through the slot 24 into the passage 22, and fed around the passage until the leading end is exposed in the area of the slot 24, after which the tail end of the locking wire is readily forced into the slot to overlap the leading end of the wire and avoid projection beyond the exterior of the female body. Obviously, in this position the tail end of the locking wire is readily accessible, and easily pried out of the slot with a pointed tool for removal when desired.

One conventional method by which the present assembly is performed, is schematically illustrated in Figure 3, wherein the apparatus comprises a head block B provided with ways 30 in which a plurality of radial swaging dies D are reciprocated by mechanical or hydraulic power. The head block is provided with a recess 31 concentric with the axis of the swaging dies to receive the female body 7 of the coupling C, while a supporting mandrel pin 32 is secured in the head B concentric with the recess 31. A removable face plate P secured to the head block retains the dies D in the ways 30, and is provided with a chamfered opening 33 through which the coupling C is inserted.

In practice the coupling is first assembled on the hose and after inserting the same into the apparatus with the insert 5 of the coupling supported upon the mandrel pin 32. The dies D are contracted to swage the shell 6 on the hose. Obviously the pin 32 prevents collapse or restriction of the insert.

In the event the insert 5 is to be expanded in co-operation with contraction of the shell, an expanding pin, similar to the mandrel 32 would be reciprocatively mounted in the head H, and actuated by either mechanical or hydraulic power, in the same manner as the swaging dies D.

When a supporting mandrel or expanding pin are not used, it is frequently desirable to check possible restriction of the insert bore, as the result of compression forces, with a gage pin.

It will be obvious that under the foregoing conditions an elbow fitting could not be attached until after the coupling is swaged on or checked. The present invention solves the problem encountered, through the provision of means for pressure sealing the coupling and fitting, and coaxially locking the two, subsequent to attachment of the coupling.

Figure 1:
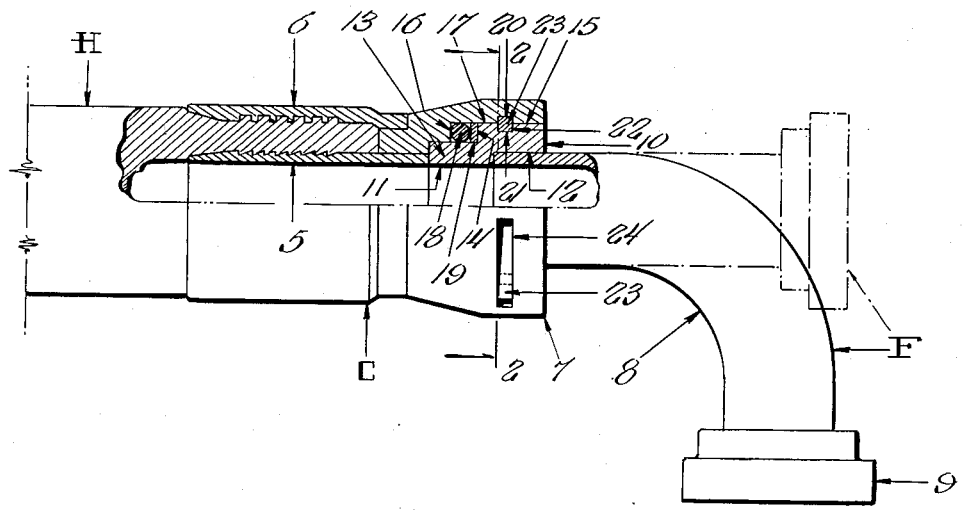
Figure 1 is an elevational view, partially in section of an elbow coupling assembly incorporating principles of the present invention.

While the primary purpose of the invention contemplates an assembly incorporating an elbow fitting, regardless of the character of locking and sealing means provided, the specific locking and sealing structure illustrated and described in detail, which provides both a detachable and swivel connection, is applicable and highly advantageous on both elbow and straight fittings, the latter being indicated in dotted lines on Figure 1 of the drawing.

Also, while the pressure seal is essential under all conditions, in some cases a permanent connection may be employed between the coupling and fitting to eliminate the detachable feature. Likewise, the swivel feature may be eliminated. Therefore, the invention as claimed is intended to include such modifications and variations.

From the foregoing explanation considered in connection with the accompanying drawing, it will be apparent that a highly novel assembly, including an elbow adapter fitting, has been devised to permit swaging of a coupling on a flexible non-metallic hose, and incidentally provide an efficient detachable pressure sealed swivel connection between a coupling and fitting, to facilitate alignment of the assembly with other equipment, and also permit ready replacement of the sealing medium in the event of deterioration.

I claim:

A swivel coupling comprising, a female member, a male member journaled in said female member, said male and female members having co-axial mating bores, and opposed complementary annular grooves in their journaled surfaces forming a passageway, said female member having an elongated transverse slot formed in its peripheral wall and communicating with its annular groove throughout the length of said slot to provide an opening between said passageway and the exterior of said female member, a flexible locking wire positioned in said passageway, said wire being of greater length than said passageway and of substantially the same cross sectional area as said passageway to lock said male and female members against relative axial movement, the inner end portion of said wire being located in said passageway within the area of said slot, and the outer end portion of said wire overlapping said inner end portion and being supported upon the same to normally entirely confine said overlapped end portions within said elongated slot and for bending said outer end portion out of said elongated slot whereby said wire may be withdrawn from said passageway, and a pressure seal interposed between said male and female members between their meeting bores and said passageway.

References Cited in the file of this patent

UNITED STATES PATENTS

| | | |
|---|---|---|
| 1,464,386 | Ingram | Aug. 7, 1923 |
| 2,310,490 | Melson | Feb. 9, 1943 |
| 2,403,368 | Howard | July 2, 1946 |
| 2,453,597 | Sarver | Nov. 9, 1948 |
| 2,458,714 | Mahoney | Jan. 11, 1949 |